(12) United States Patent
Babbrah et al.

(10) Patent No.: US 8,194,274 B2
(45) Date of Patent: Jun. 5, 2012

(54) APPARATUS AND METHOD FOR AUTOMATED CAPTURE OF DOCUMENT METADATA AND DOCUMENT IMAGING

(76) Inventors: Bhupinder Babbrah, Gilbert, AZ (US); David H. Gallivan, Jr., Gilbert, AZ (US); Mark F. Wright, Mesa, AZ (US)

( * ) Notice: Subject to any disclaimer, the term of this patent is extended or adjusted under 35 U.S.C. 154(b) by 0 days.

(21) Appl. No.: 12/795,647

(22) Filed: Jun. 7, 2010

(65) Prior Publication Data

US 2010/0328726 A1 Dec. 30, 2010

Related U.S. Application Data

(63) Continuation-in-part of application No. 11/243,632, filed on Oct. 4, 2005, now Pat. No. 7,733,522, which is a continuation-in-part of application No. 09/695,564, filed on Oct. 23, 2000, now Pat. No. 6,952,281, which is a continuation-in-part of application No. 09/001,228, filed on Dec. 30, 1997, now Pat. No. 6,192,165.

(51) Int. Cl.
*G06F 3/12* (2006.01)
*G06K 15/00* (2006.01)
*H04N 1/46* (2006.01)
*H04N 1/04* (2006.01)

(52) U.S. Cl. ....... 358/1.15; 358/1.1; 358/1.16; 358/505; 358/474

(58) Field of Classification Search ................... 358/1.1, 358/1.15, 1.16, 505, 403, 474
See application file for complete search history.

(56) References Cited

U.S. PATENT DOCUMENTS

2003/0144923 A1* 7/2003 Capozzi et al. ................. 705/26
* cited by examiner

*Primary Examiner* — Thomas Lett
(74) *Attorney, Agent, or Firm* — Wright Law Group, PLLC; Mark F. Wright

(57) ABSTRACT

The present invention provides for automated capture of metadata associated with paper-based documents. A "reservation" for the metadata and a digital image of the paper-based document is created whenever a digital image of a paper-based document is to be associated with a computer record. The relevant metadata is automatically captured from a computer screen and is then stored in a previously created database record associated with the reservation. The metadata can also be associated with a later-captured digital image of the paper-based document by placing a label on the paper-based document. The label contains identifying information for the reservation and this information becomes embedded in the digital image of the paper-based document, which is subsequently created by scanning the paper-based document and label. The subsequently created digital image can then be related to the appropriate metadata by extracting the reservation identification information from the label embedded in the digital image.

19 Claims, 6 Drawing Sheets

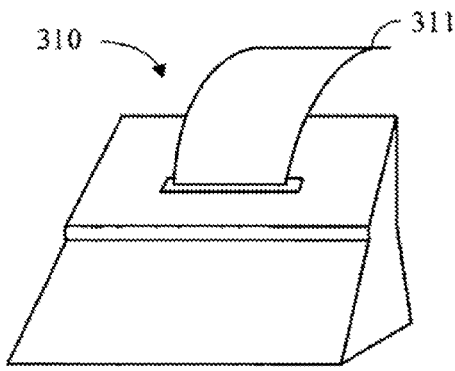
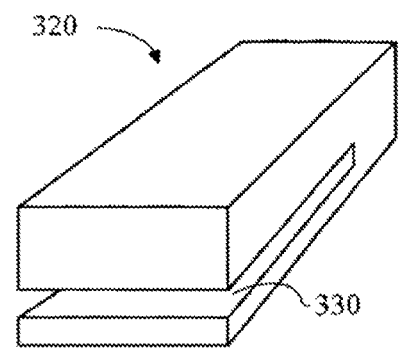
FIG. 3  FIG. 3a
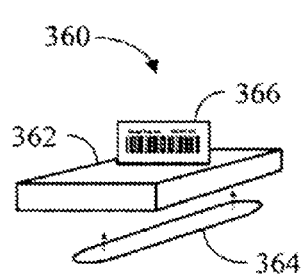
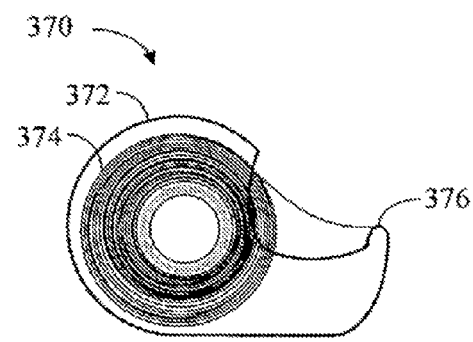
FIG. 3b  FIG. 3c
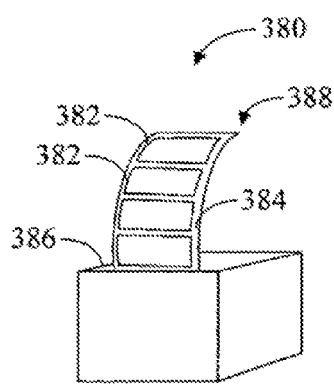
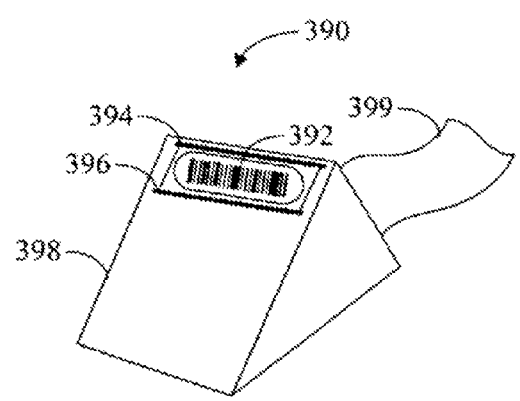
FIG. 3d  FIG. 3e

APPARATUS AND METHOD FOR AUTOMATED CAPTURE OF DOCUMENT METADATA AND DOCUMENT IMAGING

RELATED APPLICATIONS

This application is a continuation in part of U.S. patent application Ser. No. 11/243,632, filed on Oct. 4, 2005 now U.S. Pat. No. 7,733,522, which application is now pending and which application is a continuation in part of U.S. patent application Ser. No. 09/695,564, filed on Oct. 23, 2000, which application is now issued as U.S. Pat. No. 6,952,281 and which application is a continuation in part of U.S. patent application Ser. No. 09/001,228, filed on Dec. 30, 1997, which patent is now issued as U.S. Pat. No. 6,192,165, and all of which are incorporated herein by reference.

BACKGROUND OF THE INVENTION

1. Field of the Invention

The present invention relates generally to the fields of data communication and storage and relates more particularly to the use of automated methodologies to create digital images of transform paper-based documents.

2. Background Art

In today's fast-paced business environment, a major portion of many workers' responsibilities include the receipt and processing of information. Data, in the form of letters memos, reports, charts, graphs, etc., arrives in many forms in many different locations. Much of this information is presently transmitted, received, stored, and processed using rapidly evolving computer-based technologies. For example, cloud computing, email, instant messaging, digital voice communication, etc. are becoming increasingly popular methods of transmitting and storing information.

While significant quantities of data and information are readily available in a digital format, paper remains a viable method for communicating information in the modern world. Despite the rapid growth of electronic commerce and computerized processing methodologies, paper remains ubiquitous in many areas of business. Now, with the rapid increase in digitized information, the transformation and integration of paper-based documents into the digital world is becoming increasingly more important.

Unfortunately, many business processes remain trapped in the limbo between digital documents and digital records. This dichotomy may impose certain processes and methods that are time-consuming and inefficient for many businesses. For example, even if the processing of product orders has been mostly computerized, it is not uncommon for paper-based documents to be introduced at some point in the cycle. This includes shipping and product return documents, consumer inquiries, etc. Each time a piece of paper is introduced into a computerized process, the process slows down as the human element is introduced into the equation to deal with the paper-based documents. In particular, the paper must generally be categorized by type of document, date received, source of the document, purpose of the document, etc. In addition, the paper-based document must be integrated into the computerized process. This typically involves the quantification and manual entry of "metadata" (e.g., data related to identifying and categorizing a document) into a computerized system. Further, the process may also involve creating a digital image of the paper-based document and then storing the digital image of the paper-based document in an image database. Finally, once all of this has been accomplished, the digital image of the paper-based document and the associated metatags must be associated in some meaningful way so that the digital image of the paper-based document can be retrieved as part of the workflow associated with the computerized process. All of these steps are time-consuming, error-prone, and labor intensive, often leading to a drop in productivity and efficiency for many organizations.

As shown by the discussion herein, without additional improvements in the systems and methods utilized in capturing metadata and integrating paper-based documents into computerized processes, the overall efficiency will continue to be sub-optimal.

SUMMARY OF THE INVENTION

The present invention comprises a hardware/software combination that is configured to provide for automated capture of metadata associated with paper-based documents. A "reservation" for the metadata and a digital image of the paper-based document is created whenever a digital image of a paper-based document is to be associated with a computer record. The relevant metadata is automatically captured from a computer screen and is then stored in a previously created database record associated with the reservation. Additionally, the metadata can also be associated with a later-captured digital image of the paper-based document by placing a label on the paper-based document. The label contains identifying information for the reservation and this information becomes embedded in the digital image of the paper-based document, which is subsequently created by scanning the paper-based document bearing the label. The subsequently created digital image can then be related to the appropriate metadata by extracting the reservation identification information from the label embedded in the digital image. The overall process provides for automated capturing of metadata and then relating the metadata to a subsequently created digital image of the paper-based document, thereby reducing errors and increasing efficiency by minimizing human interaction in the process.

BRIEF DESCRIPTION OF THE DRAWINGS

The preferred embodiments of the present invention will hereinafter be described in conjunction with the appended drawings wherein like designations denote like elements and:

FIG. 3 is a perspective view of a desktop document label printing mechanism according to a preferred embodiment of the present invention;

FIG. 3a is a perspective view of a desktop document labeling mechanism according to a preferred embodiment of the present invention;

FIG. 3b is a perspective view of a desktop label dispenser for dispensing pre-printed labels according to a preferred embodiment of the present invention;

FIG. 3c is a side view of a desktop label dispenser for dispensing pre-printed labels according to an alternative preferred embodiment of the present invention;

FIG. 3d is a perspective view of a desktop label dispenser for dispensing pre-printed labels according to an alternative preferred embodiment of the present invention;

FIG. 3e is a perspective view of a desktop label dispenser for dispensing pre-printed labels according to an alternative preferred embodiment of the present invention;

FIG. 4 is a typical label generated by the desktop label printer of FIG. 3 or the document labeling mechanism of FIG. 3a;

DETAILED DESCRIPTION

Figure 1:
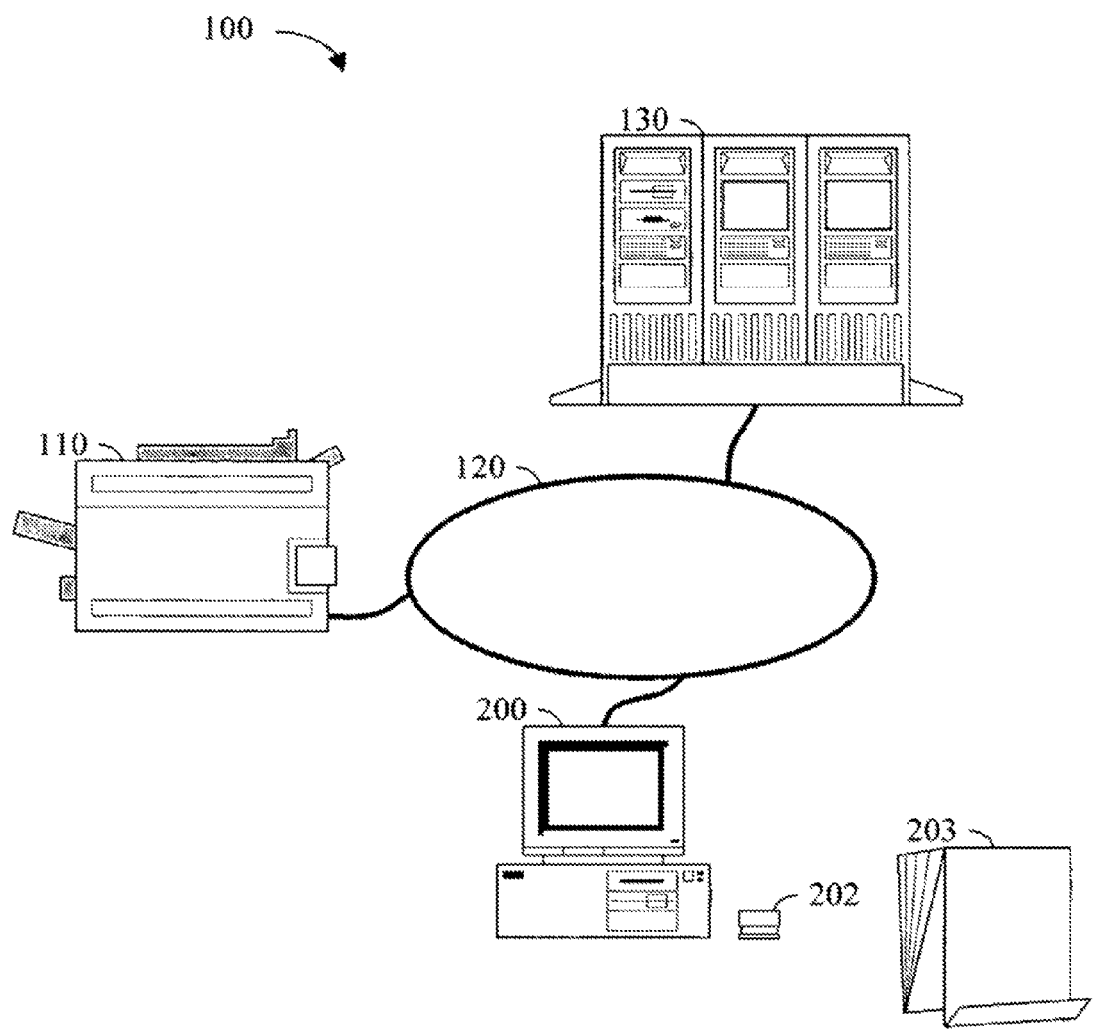
FIG. 1 is a block diagram of a digital filing apparatus for indexing, imaging, storing and retrieving documents according to a preferred embodiment of the present invention.

Referring now to FIG. 1, a digital filing system 100 according to a preferred embodiment of the present invention includes: a computer 200; a desktop label dispenser 202; an optional folding out basket 203; a document input mechanism 110; a server 130; and a communication link 120. Taken together, digital filing system 100 provides a way for office workers to index, store, and manage paper-based documents, regardless of their origin.

Desktop label dispenser 202 is a specialized device which is capable of dispensing pre-printed labels that will typically include a computer readable document identifier and/or bar code along with corresponding human-readable information (i.e., eye-legible content). The document identifiers, which in the most preferred embodiment are pre-printed on labels contained in desktop label dispenser 202, may be implemented as bar codes that conform to some industry accepted bar code standard such as interleaved 2 of 5, code 39, code 138, PDF 417, or other high-density symbology (e.g., 3D barcodes). Alternatively, proprietary or customized bar code symbologies may be employed.

Various label dispensers are further described in conjunction with FIGS. 3b, 3c, 3d, and 3e below. Alternatively, a desktop label printer or a desktop labeling mechanism (shown in FIGS. 3 and 3a) may be employed to print labels on demand. If a desktop label printer or desktop labeling mechanism is used to generate document identifiers and/or labels containing document identifiers, it may take the place of desktop label dispenser 202 shown in FIG. 1 and may be connected using any industry standard serial, parallel, or other computer connection. Additionally, in some preferred embodiments of the present invention, desktop label dispenser 202 may be used in conjunction with a desktop label printer or desktop labeling mechanism. The use of a desktop label printer or desktop labeling mechanism is described in conjunction with FIGS. 3 and 3a below. Regardless of the method used to produce the labels, each of the labels will contain a document identifier which may be globally unique and which identifies the paper-based document to which the label is applied. A preferred embodiment of a representative label is further described in conjunction with FIGS. 4, 4a, and 4b below.

Folding out basket 203 is an optional accessory that can be effectively utilized with system 100. Folding out basket 203 is provided as a physical desktop storage and staging location, used for indexing paper-based documents, storing paper-based documents, and transporting paper-based documents after they have been indexed and labeled by the user. The paper-based documents can be staged in folding out basket 203 during the day and then transported to a centralized scanning location for batch scanning at pre-determined intervals or on an as-desired basis. In addition to folding out basket 203, additional system components such as collection and storage boxes/containers may be deployed. These collection and storage boxes may hold paper-based documents stored in multiple folding out baskets 203 and could be used to transport and archive the paper-based documents after they have been imaged using system 100.

Document input mechanism 110 is any type of device which is capable of scanning or imaging a document. For paper-based documents, flatbed scanners, drum scanners, digital copiers, fax machines, multi-function copiers ("mopiers"), etc. are all examples of document input mechanisms 110 which can be used in various embodiments of the present invention. The purpose of document input mechanism 110 is to scan/image a paper-based document and create a computer file that contains a digital image of a paper-based document. This file is then stored on server 130. In addition, digital transmission of e-mail, faxes etc. may also be considered to be various forms of document input mechanism 110.

Server 130 represents a larger computer system, usually providing secondary storage for storing images which are scanned/imaged by document input mechanism 110. Additionally, server 130 will typically be configured with one or more databases that can be used in enterprise environments to store and share information that will be made available to multiple disparate users. In the most preferred embodiments of the present invention, server 130 will be a centralized storage location for many different types of information.

Various components such as hard disk drives, recordable CD-ROM/DVD drives and jukeboxes, magnetic tapes, and other devices known to those skilled in the art may be used to implement server 130. Digital document images captured by document input mechanism 110 may be transmitted to server 130 via communication link 120. Digital document images stored on server 130 may be transmitted to computer 200 via communication link 120. Server 130 may contain removable, transportable, image storage media, such as magneto-optical media, a DVD disk, or a CD-ROM disk.

Communication link 120 is any suitable computer communication link or communication mechanism, including a hardwired connection, an internal or external bus, a connection for telephone access via a modem or high-speed T1 line, infrared or other wireless communications, computer network communications over the Internet or an internal network (e.g. "intranet") via a wired or wireless connection, or any other suitable connection between computers and computer components, whether currently known or developed in the future. It should be noted that portions of communication link 120 may be a dial-up phone connection, broadcast cable transmission line, Digital Subscriber Line, ISDN line, or similar public utility-like access media.

In operation, a paper-based document is received by a user of system 100. The user will use system 100 to index the document. Indexing a document is the process of assigning "metadata," thereby describing the document and/or the contents of the document, and using the computer to capture the metadata. In the most preferred embodiments of the present invention, the metadata is captured automatically by system 100. The metadata, or indexing information, is stored in a record in a database at the time of indexing. System 100 generates or coordinates a document identifier for the paper-based document at the time of indexing. Since system 100 tracks each document identifier, and tracks the user for each document identifier, it can sequence through a series of pre-programmed document identifiers in a pre-programmed fashion. This sequence will match the sequence of the pre-printed labels exactly. Thus, the user can place a label containing the document identifier from label dispenser 202 onto the paper-based document. Since system 100 is tracking the document identifiers, the user, and the metadata, the document identifier on the label can be matched to the next sequential document identifier available in system 100.

Since the two document identifiers match, the document identifier is used to effectively link the document image to the record in the database, facilitating later retrieval of the document image, typically via the indexes or the document identifier. Alternatively, computer 200 communicates with a desktop label printer which generates a label for the paper-based document that contains the document identifier and any other descriptive information used to identify the document, or uses a desktop labeling mechanism to print the document identifier directly onto the document. In any case, the software associated with system 100 provides the capability to "auto-increment" the document identifier, automatically creating or synchronizing the next identifier with the next identifier printed on the pre-printed labels.

After the document identifier has been applied to the first page of the paper-based document, the document may be stored in folding out basket 203 until the document is ready to be introduced into system 100 using document input mechanism 110. In some preferred embodiments of the present invention, instead of placing a document identifier on the first page only, a separate identifier may be placed on each page of a paper-based document prior to scanning. When the paper-based document is subsequently scanned, an image of the paper-based document (including the document identifier) is created and the previously-determined document identifier is extracted. After imaging/scanning, the image of the paper-based document is stored in an image repository in a default storage location, such as on server 130, using the previously generated document identifier as the basis for the image file name for the image, thereby linking the document image to a record in an image index database. In some embodiments of the present invention, the document identifier will be the file name or will form the basis for creating the file name used in naming the digital image of the paper-based document.

Communication link 120 provides for communication between the various components of system 100 and allows the document image to be transmitted from device to device. In this fashion, a user can quickly and easily gain access to the electronic images of paper-based documents. Examples of communication link 120 include a Local Area Network (LAN), an Intranet, or the Internet. The connection made by communication link 120 may also be wireless. Communication link 120 logically links the physical components of system 100 together, regardless of their physical proximity. This is especially important because in many preferred embodiments of the present invention, it is anticipated that computer 200, document input mechanism 110, and server 130 may be geographically remote and that the indexing process, scanning/imaging process, and storage process will occur in sequential order but will be operationally independent. By labeling the document prior to scanning, and by pre-establishing the image identifier and including the identifier in the label, this method removes the need for any other communication or direct connectivity between the index, scan, and storage processes.

The image of the paper-based document carries the information necessary to link the index, scan, and storage processes, when and as necessary. In addition, by associating or assigning a given group of pre-printed labels containing unique document identifiers to an individual or group of individuals, greater security measures can be afforded to the digital images of the paper-based documents, once the paper-based documents are scanned. By examining the relationship between the identifier extracted from the digital image, "ownership" of the digital image can be established without further human intervention. Access to the digital images can then be controlled, as desired.

While designed primarily to deal with incoming paper-based documents, as mentioned earlier, it is also contemplated that incoming electronic documents (e-mail, documents downloaded from the Internet, etc.) could also be indexed and stored using system 100. In the case of electronic documents, the scanning/imaging of the document would not be necessary. In the case of electronic documents, the label containing the document identifier could be printed directly onto the lead page of a document. Then, when the document is subsequently scanned, the document identifier can be used to link the image of the document to a database containing the metadata for the document image. This is especially useful in situations such as delivery receipts, where an invoice is generated by a company, sent out for delivery, signed at the point of delivery and then returned to the point of origin for proof of delivery.

Figure 2:
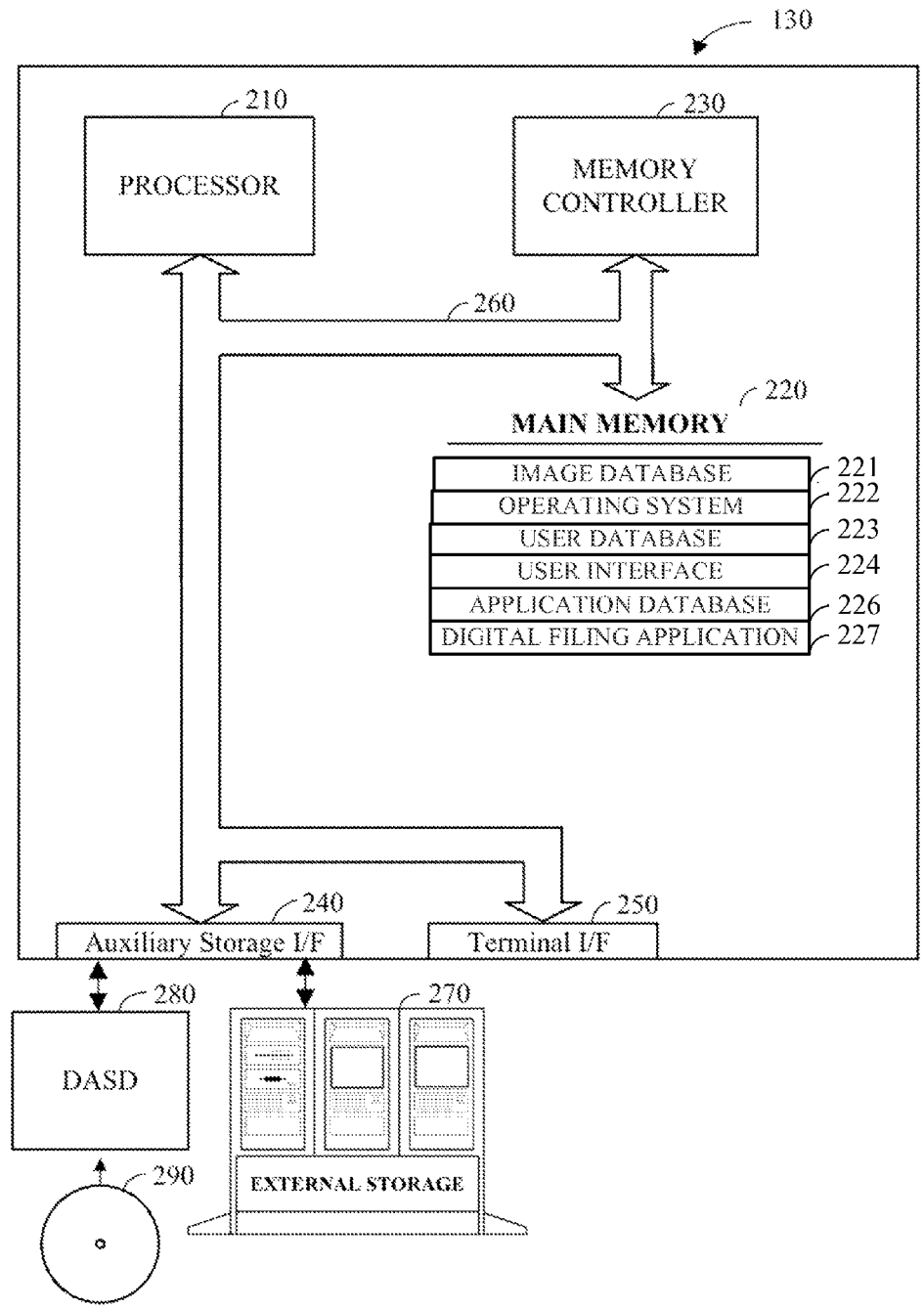
FIG. 2 is a block diagram of a computer/server suitable for use with the apparatus of FIG. 1.

Referring now to FIG. 2, Data server 130 represents a relatively powerful computer system that is made available to desktop computer 200 via network 120. Various hardware components (not shown this FIG.) such as external monitors, keyboards, mice, tablets, hard disk drives, recordable CD-ROM/DVD drives, jukeboxes, fax servers, magnetic tapes, and other devices known to those skilled in the art may be used in conjunction with data server 130. Data server 130 may also provide various additional software components (not shown this FIG.) such as database servers, web servers, firewalls, security software, and the like. The use of these various hardware and software components is well known to those skilled in the art. Given the relative advances in the state-of-the-art computer systems available today, it is anticipated that functions of data server 130 may be provided by many standard, readily available data servers. This may also include the deployment of multiple inter-connected data servers 130 to enhance the availability and reliability of the functions provided by data server 130. Depending on the desired size and relative power required for data server 130, storage area network (SAN) technology may also be deployed in certain preferred embodiments of the present invention. Additionally, various biometric and identification verification devices for creating and verifying digital signatures (i.e., electronic signature processing) may also be included.

Given the relative advances in the state-of-the-art computer systems available today, it is anticipated that functions of data server 130 may be provided by many standard, readily available data servers. This may also include the deployment of multiple inter-connected and redundant data servers 130 to enhance the availability and reliability of the functions provided by data server 130. Depending on the desired size and relative power required for data server 130, storage area network (SAN) technology may also be deployed in certain preferred embodiments of the present invention. Additionally, various biometric and identification verification devices for identifying users and controlling access as well as creating and verifying digital signatures (i.e., electronic signature processing) may also be included.

Processor 210 performs computation and control functions of server 130, and may comprise a single integrated circuit, such as a microprocessor, or may comprise any suitable number of integrated circuit devices and/or circuit boards working in cooperation to accomplish the functions of a processor. Processor 210 typically executes and operates under the control of an operating system 222 within main memory 220.

Auxiliary storage interface 240 allows server 130 to store and retrieve information from auxiliary storage devices, such as server 130, magnetic disk drives (e.g., hard disks or floppy diskettes) or optical storage devices (e.g., CD-ROM). One suitable storage device is a direct access storage device (DASD) 270. As shown in FIG. 2, DASD 270 may be a floppy disk drive which may read programs and data from a floppy disk 280. It is important to note that while the present invention has been (and will continue to be) described in the context of a fully functional computer system, those skilled in the art will appreciate that the various mechanisms of the present invention are capable of being distributed as a program product in a variety of forms, and that the present invention applies equally regardless of the particular type or location of signal bearing media used to actually carry out the distribution. Examples of signal bearing media include: recordable type media such as floppy disks (e.g., disk 280) and CD ROMS, and transmission type media such as digital and analog communication links, including wireless communication links.

Memory controller 230, through use of a processor (not shown) separate from processor 210, is responsible for moving requested information from main memory 220 and/or through auxiliary storage interface 240 to processor 210. While for the purposes of explanation, memory controller 230 is shown as a separate device, those skilled in the art understand that, in practice, portions of the function provided by memory controller 230 may actually reside in the circuitry associated with processor 210, main memory 220, and/or auxiliary storage interface 240.

Terminal interface 250 allows system administrators and computer programmers to communicate with server 130, normally through programmable workstations. Although server 130 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used.

Main memory 220 suitably contains an image database 221, an operating system 222, a user database 223, a user interface 224, an application database 226, and a digital filing application 227. The term "memory" as used herein refers to any storage location in the virtual memory space of server 130. It should be understood that main memory 220 will not necessarily contain all parts of all mechanisms shown. For example, portions of operating system 222 may be loaded into an instruction cache (not shown) for processor 210 to execute, while other files may well be stored on magnetic or optical disk storage devices (not shown). In addition, although image database 221 is shown to reside in the same memory location as operating system 222, it is to be understood that main memory 220 may consist of multiple disparate memory locations.

Operating system 222 includes the software which is used to operate and control server 130. Operating system 222 is typically executed by processor 210. Operating system 222 may be a single program or, alternatively, a collection of multiple programs which act in concert to perform the functions of any typical operating system, which functions are well known to those skilled in the art.

Image database 221 can be any type of computer filing or storage structure known to those skilled in the art. In the most preferred embodiments of the present invention, image database 221 is simply a database of indexed images. In one preferred embodiment of the present invention, image database 221 may be a Structured Query Language (SQL) compatible database file capable of storing records containing images. In another preferred embodiment of the present invention, image database 221 is an image directory on a DVD or CD-ROM disk which can be easily transported from one geographic location to another.

User database 224 is any database capable of being configured to store and manage information relating to the users of system 100. This includes identity, passwords, account information, labels that have assigned to the user, permissions, etc.

Application database 226 is the database where the records for the information used by one or more software applications are stored. This could be any type of application, whether or not the software application is capable of integrating images or not.

In at least one preferred embodiment of the present invention, digital filing application 227 works in conjunction with user interface 224 (including a web browser based interface) to provide the various functions of the present invention including a user interface and indexing tools used to prepare a document for subsequent scanning/imaging and electronic filing.

Digital filing application 227 also incorporates standard database management tools to provide record management capabilities (add, modify, delete, etc.) for image database 221 and other databases as well as various administrative utilities.

It should be noted that an image or images from image database 221 may be loaded into main memory 220 and/or a cache memory storage location (not shown) for access and viewing by via user interface 224 of digital filing application 227. If a web browser is not utilized, any other standard image viewer may be employed. Since the images will be stored using industry standard formats such as portable document format (PDF) or tagged image file format (TIFF), those skilled in the art will recognize that there are many options for viewing images, including readily available system software and viewers that can be downloaded from the internet. In addition, the use of PDF and TIFF is not exhaustive, it is anticipated that various types of image formats may be used in various preferred embodiments of the present invention. The most preferred embodiments of the present invention also use the header of the digital image file to store index information related to the digital image.

Referring now to FIG. 3, a desktop label printer 310 according to a preferred embodiment of the present invention is shown. In a first preferred embodiment, desktop label printer 310 generates a bar code and eye-legible information on linerless label stock 311. Linerless label stock 311 can then be separated into individual labels that are subsequently applied by hand to a paper-based document which is to be scanned and stored using system 100 of FIG. 1. In an alternative preferred embodiment of the present invention, desktop label printer 310 is a standard printer and prints an entire document, with bar coded information contained on the printed document. This is especially useful when a company or organization is preparing paper-based documents which will be written upon and imaged at a later date. For example, if a company prints an invoice with a document identifier printed on it, the invoice can be sent out with a delivery driver, signed, and then returned to the company. After receipt, the paper-based invoice can be scanned using system 100 and the invoice will be automatically filed using the methods of the present invention.

Referring now to FIG. 3a, a preferred embodiment of a desktop labeling mechanism 320 prints and applies a label directly onto the paper-based document (like an electronic stapler). As shown in FIG. 3a, desktop labeling mechanism 320 has an opening 330 for receiving paper-based documents or pages of a paper-based document. The user can insert the paper into opening 330 and desktop labeling mechanism 320 will apply the printed label directly to the paper. In yet another alternative preferred embodiment of desktop labeling mechanism 320, the label information (bar code and eye-legible content) is printed directly on the paper-based document without using a separate label. The content of the bar code and eye-legible information for all of the labels described in conjunction with FIGS. 3, 3a, 3b, 3c, 3d, 3e, 4, 4a, 4b, 4c, and 4d is discussed in conjunction with FIGS. 5, 6, and 6a below.

Referring now to FIG. 3b, a desktop label dispenser 360 for dispensing pre-printed labels in accordance with a preferred embodiment of the present invention includes: a label containing portion 362; a selectively removable adhesive attachment portion 364; and a pad of pre-cut, individual, pop-up labels 366. Label dispensing portion 312 dispenses individual labels from pad 366 one at a time in a pop-up fashion. A single pop-up label 420 from a typical pad of pop up labels 366 is shown in FIG. 4b. FIG. 4c shows a side view of a pad of pop-up labels 366. In the most preferred embodiments of the present invention, selectively removable adhesive attachment portion 364 is a piece of double stick tape or other suitable mechanism for affixing label containing portion 362 to a desk top or other similar surface.

Referring now to FIG. 3c, a desktop label dispenser 370 for dispensing labels in accordance with an alternative preferred embodiment of the present invention includes: a case portion 372; a roll of linerless labels 374; and a cutting edge 376. When using dispenser 370 to dispense individual labels from roll of labels 374, the user grasps the free end of roll of labels 374 and uses cutting edge 376 to separate a single label from roll of labels 374. In use, this is very similar to the action used to dispense a piece of clear plastic tape from a standard tape dispenser.

Referring now to FIG. 3d, a desktop label dispenser 380 for dispensing labels in accordance with an alternative preferred embodiment of the present invention includes: a box portion 386 and a roll of labels 388. Roll of labels 388 comprises a backing liner 384 and a series of individual pre-cut, pre-printed labels 382. Box portion 386 is used to store and dispense individual pre-cut, pre-printed labels 382 from roll of labels 388.

Referring now to FIG. 3e, a desktop label dispenser 390 for dispensing labels in accordance with an alternative preferred embodiment of the present invention includes: a label-containing portion 398; a dispensing slot 396; a take-up slot 394; and a roll of individual, pre-cut, pre-printed labels 392 placed on backing liner 399. In use, label-containing portion 398 contains roll of labels 392 and backing liner 399 is fed first through dispensing slot 396 and then through take-up slot 392. This allows a user to grasp backing liner 399 with their hand and pull backing liner 399. As backing liner 399 is pulled, a single label 392 is displayed between dispensing slot 396 and take-up slot 394. The user can remove displayed label 392 from backing liner 399 and place it onto a document.

Figure 4:

Referring now to FIG. 4, a sample label 400 generated by desktop labeling mechanism 202 is illustrated. As shown in FIG. 4, label 400 contains two separate portions, an eye-legible information portion 410 and a computer readable bar code portion 420. Eye-legible information portion 410 is provided as a convenience for the user of system 100 and provides basic information about a paper-based document or about how a given paper-based document is to be processed. Computer readable portion 420 is used to contain, transport, and store the document identifier to be used when the scanned image is stored on server 130 of FIG. 1.

While the information contained in these two different portions may be identical, for security reasons the information in these two different portions may be different. It should be noted that the use of typical bar code symbology to encode the document identifier anticipates the use of many different types of symbologies. This includes those symbologies that represent digital information as shading within an icon (2d bar code symbologies) or any other symbology capable of representing large quantities of information in a digital format. In many preferred embodiments, the preprinted document identifier will simply be a unique number represented in a traditional bar code symbology such as Interleaved 2 of 5 or code 39. Also note that the bar code or machine readable portion of the label may include additional information, besides the document identifier to be used when storing the digital image of the paper-based document. For example, information on document disposition or additional index data for the document may be contained in the bar code.

Figure 4A:
FIG. 4a is a typical label dispensed by the desktop label dispensers of FIG. 3c, FIG. 3d, and FIG. 3e.
Figure 4B:
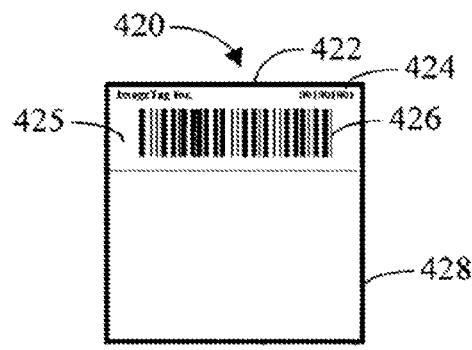
FIG. 4b is a typical label dispensed by the desktop label dispensers of FIG. 3b.
Figure 4C:
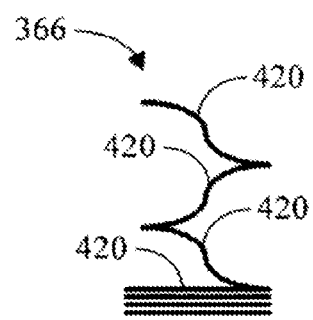
FIG. 4c is a side view of a pad of pre-printed labels dispensed by the dispenser shown in FIG. 3b.

Referring now to FIG. 4a, a sample pre-printed label 410, typical of the type of labels dispensed from desktop label dispensers 370, 380, and 390 is shown. Desktop label dispensers 370, 380, and 390 dispense individual labels from a roll of sequentially numbered labels. As with the label shown in FIG. 4, typical label 410 contains two separate portions, an eye-legible information portion 412 and a computer readable bar code portion 414.

The most preferred embodiments of pre-printed labels used in conjunction with the present invention utilize the Interleaved 2 of 5 bar code symbology to represent the document identifier for a digital image to be created in the future. When using preprinted labels, digital filing application 227 is synchronized with the bar-coded numbers on the pre-printed labels. Digital filing application 227 allows a user of system 100 to easily increment or decrement the numbers used as document identifiers to maintain synchronization, in case a user accidentally destroys a label. Since the preprinted bar-coded numbers on the labels are sequential, once digital filing application 227 has been synchronized with the first pre-printed label, the numeric document identifiers created by digital filing application 227 and numbers on the pre-printed labels advance in lock-step sequence. Once a roll or pad of labels has been expended, a new roll or pad of labels can be loaded and synchronized with digital filing application 227 once again.

Referring now to FIG. 4b, a typical pre-printed label 420, dispensed by desktop label dispenser 360 (shown in FIG. 3) is shown. Label 420 is typical of a single label dispensed from pad 366, as shown in FIG. 4c. As shown in FIG. 4b, label 420 contains an eye-legible information portion 424 and a computer readable bar code portion 426 printed on an acetate or similar film product 422. Label 420 most preferably comprises an opaque portion 425 and a clear portion 428. Eye-legible information portion 424 and a computer readable bar code portion 426 are printed on opaque portion 425. In the most preferred embodiments of the present invention, the surface of clear portion 428 is suitable for writing upon. This allows the user to make comments regarding the paper-based document to which it is attached.

Referring now to FIG. 4c, pad 366 is composed of a series of individual labels 420. The individual labels 420 are joined together by an adhesive such that they form a fan-fold configuration. When the user pulls a first label 420 from dispenser 360, the next label 420 is pulled into the dispensing position by the force of removing the first label 420, in a pop-up fashion. Similarly, when the second label 420 is pulled from dispenser 360, the third label 420 is pulled into the dispensing position. In this fashion, each of the individual labels 420 in pad 366 can be dispensed one at a time and applied to documents.

Figure 4D:
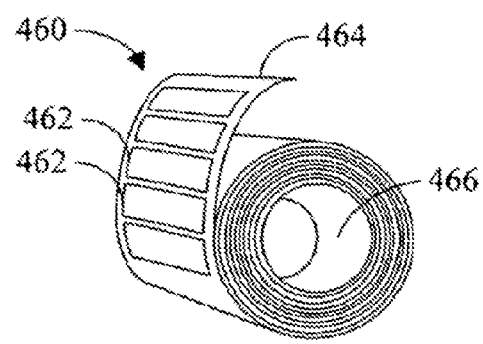
FIG. 4d is a perspective view of a roll of pre-printed labels dispensed by the dispensers shown in FIG. 3d and FIG. 3e.

Referring now to FIG. 4d, an alternative preferred embodiment for a roll of individual pre-printed labels 460 is shown. Roll 460 is typical of the type of labels which could be dispensed from label dispensers 380 and 390. Roll 460 comprises a backing liner 464 and a series of individual pre-printed, pre-cut labels 462 wound on an optional core 466. If provided, optional core 466 is used to provide stability for roll 460 during the dispensing operation and may be sized as required. Labels 462 may be printed on any suitable pressure sensitive adhesive backed paper. Labels 462 may utilize a repositionable adhesive or a permanent adhesive, depending on the application requirements.

Figure 5:
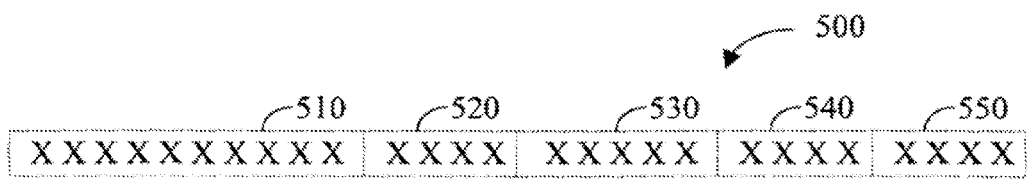
FIG. 5 is a generic illustration of a document naming and labeling convention according to a preferred embodiment of the present invention.

Referring now to FIG. 5, a generic description of the content of a label 500 according to a preferred embodiment of the present invention is described. As shown in FIG. 5, label 500 includes a unique document number, which can be used to relate the scanned image to the image file name or which can become the actual image file name after the document is scanned and may include the following components: a software serial number field 510; a security field 520; an indexing date field 530; a UserID field 540; and a document counter field 550. Software serial number field 510 is used to identify a unique customer. In at least one preferred embodiment of the present invention, it is anticipated that each copy of the software program product which provides the features of the present invention will have a unique serial number associated with it. This will provide a unique code to identify each user of a system 100 that, when concatenated with the other numbers, will guarantee that each document number associated with every document will be globally unique. This is important because it is anticipated that third party vendors who may be contracted for the purpose of providing storage space for images and vendors must have a reliable method of uniquely identifying, segregating, securing, and storing images from multiple clients. One alternative preferred embodiment of the present invention will use the serial number or a unique customer identification number to identify each client in a database over the Internet.

When using pre-printed labels, for at least one preferred embodiment of the present invention, individual users of system 100 will be assigned ranges of numbers (e.g, the package of pre-printed labels provided to each user will be registered to that specific user and associated with the documents for that user) and no pre-printed labels will provide duplicate numbers. Alternatively, different symbologies can be used by different users, and the numbers from one symbology can thereby be distinguished from identical numbers created using a different symbology. In certain embodiments, e.g. when using pre-printed numbers, the only piece of information that will be printed on the label will be the numeric document identifier. The other information shown in FIG. 5 can still be stored in image index database 228 and accessed by referencing the document identifier contained in a label.

Security field 520 is used to provide various security features, such as a user-established code to ensure that document numbers are established under the control or security of the company that owns the documents. In addition, security field 520 can customized and configured to provide internal security measures, thereby limiting access to sensitive document images. Indexing date field 530 provides the date that the document was indexed by the user of system 100. UserID field 540 is used to identify the user who indexed the document for storage. The identity of the user is typically determined by the system via logon ID. Document counter field 550 is used to track the number of documents indexed by a user on a given date.

Figure 6:
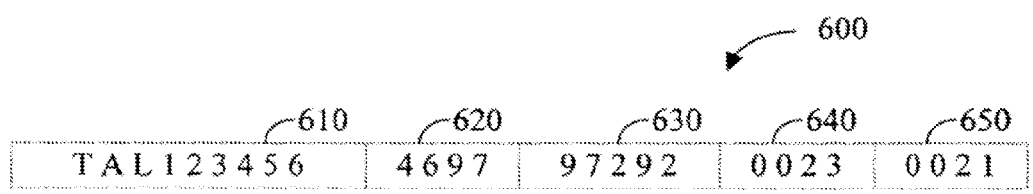
FIG. 6 is a specific illustration of a document naming and labeling convention according to a preferred embodiment of the present invention.

Referring now to FIG. 6, a specific example of a label 600 with field components corresponding to FIG. 5 is illustrated. As shown in FIG. 6, software serial number field 610 contains "TAL123456." This identifies a specific customer and can pinpoint the licensed digital filing application software that issued that specific document number. As shown in FIG. 6, security field 620 contains a security code "4697" which describes a user-defined security aspect for accessing this particular document. Indexing date field 630 contains "97292" which is the Julian date representation for the date of the indexing session (i.e., Oct. 19, 1997). UserID field 640 contains the user identification number "0023. This indicates that user 0023 is the user who indexed the document. Document counter field 650 contains "0021" which indicates that this particular label is being generated for the $21^{st}$ document indexed on this date by this user. To create an image storage file name, a file name extension is appended to the number shown in FIG. 6. To accommodate image file formats and conventions that require unique file names for each individual page of a multi-page document, an optional page-numbering field may also be appended to the number shown in FIG. 6. In addition, other fields for other purposes may also be added. It is contemplated that various additional fields will be developed for specific processing environments.

Figure 6A:
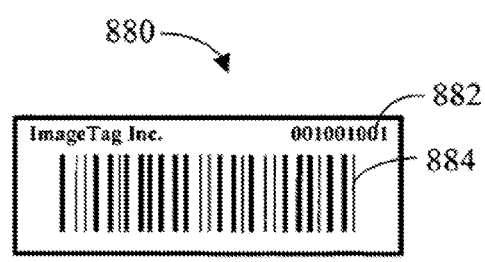
FIG. 6a is a specific illustration of a label according to a preferred embodiment of the present invention.

Referring now to FIG. 6a, a specific example of a simplified label 880 is illustrated. As shown in FIG. 6a, eye-legible portion 882 contains the numeric value 001001001. This numeric value is actually the same as the bar-coded number represented in bar code portion 884. In this embodiment, only the number contained in eye-legible portion 882 and bar code portion 884 is used as the unique document identifier for the digital image of the paper-based document to which label 880 is attached.

Figure 7:
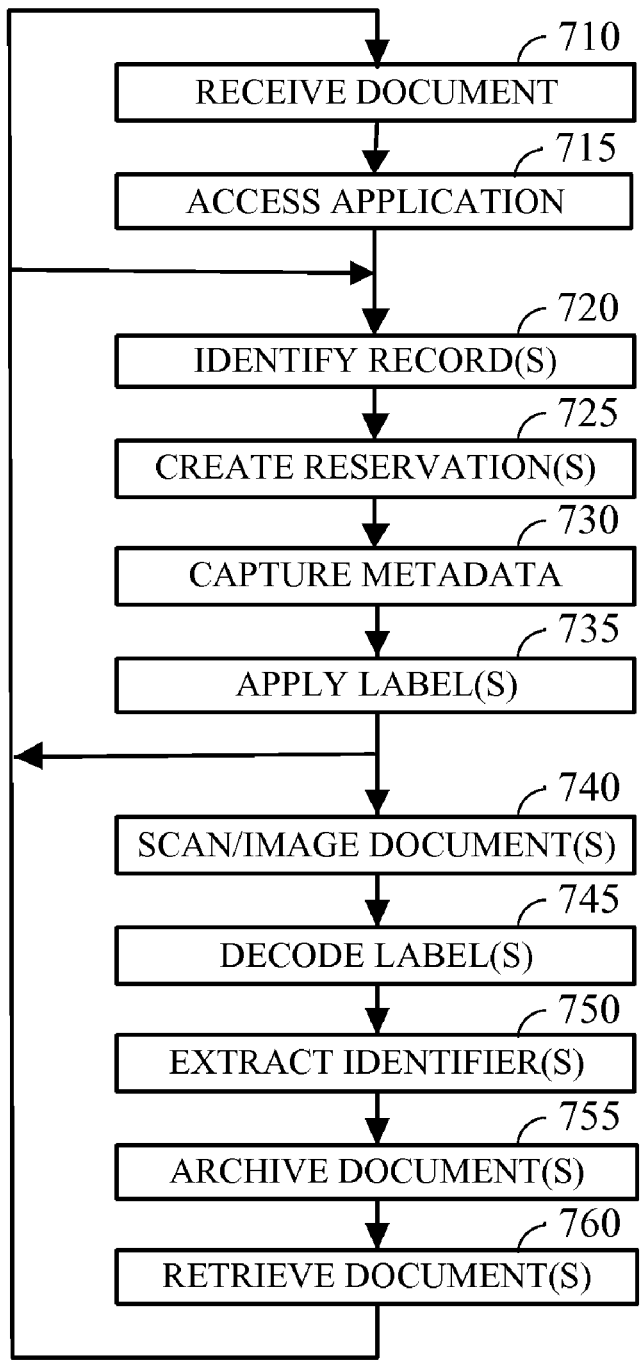
FIG. 7 is a flow chart of a method of automatically capturing metadata and associating digital images of paper-based documents with records in various software applications.

Referring now to FIG. 7, a method 700 for capturing metadata and adding digital images of paper-based documents in accordance with a preferred embodiment of the present invention is depicted. To begin with, each user will have been allocated a series of pre-printed labels, such as those described in conjunction with FIG. 3b, FIG. 3c, FIG. 3d, or FIG. 3e. The software system will be able to identify who the user is that "owns" the labels by checking a database (e.g., as described in FIG. 2). Whenever a user receives a paper-based document (step 710), the user can elect to associate a digital image of that paper-based document with a pre-existing electronic record. The user can access the application that is used to store the electronic records (step 715). This application may be a standard PC-based application or an Internet-based Software as a Service (SaaS) application. Once the user has launched or otherwise accessed the appropriate software application, then the record that should be linked to the paper-based document can be identified (step 720).

Next, the user will interact with the software application to create a "reservation" for the yet-to-be-imaged paper-based document (step 725). A reservation involves the creation of a new database record in a database (e.g., as described in FIG. 2) that will be used to store the metadata that is to be associated with the selected paper-based document and the selected record. This may be accomplished by many different methods. In the most preferred embodiments of the present invention, there will be an icon displayed on the monitor or screen that is being used by the user. The icon be part of user interface 224 of FIG. 2 and will provide some indicia to alert the user that they can click on the icon to create the reservation.

For each software application that has been configured to work with the present invention, the desired metadata and position of the desired metadata on the screen and in the database record will have been previously identified. Once the user has created the reservation, the system will automatically "screen scrape" the record displayed on the monitor to capture the pre-identified metadata (step 730). Alternatively, the system could be programmed to extract the data from the record database to gather the appropriate metadata. In any case, the captured metadata will be stored in the database record associated with the reservation that was just created. In addition, the system will associate the next sequential number that has been allocated to the user that created the reservation. This will allow the system to match the later-created digital image of the paper-based document to the metadata that has just been captured.

Next, the user will be prompted to affix the next sequential label to the paper-based document for which the reservation has just been created and for which the metadata has just been gathered (step 735). It should be noted that this process can be repeated for multiple documents, in a "batch" fashion. In addition, there will be a user interface provided that will allow the user to adjust the sequential number associated with the reservation in case the sequential numbering has gotten out of sequence.

At some point in time, after a single document reservation has been created or after multiple document reservations have been created, the user will scan or otherwise create an image of the paper-based document(s) (step 740), thereby creating digital images of the paper-based documents.

The system will receive each of the digital images and decode the image (e.g., parse the digital image to locate the label that was affixed to the paper-based document by the user). Once the label has been located and decoded (step 745), the system will extract the identifier from the image of the label that is embedded within the digital image of the paper-based document (step 750).

Next, the digital image of the paper-based document can be stored in an image database (e.g., as described in FIG. 2) and the reservation information, including the metadata, can be linked to the image via the identifier that was extracted from the image of the label that was embedded in the digital image of the paper-based document.

The key points of at least one preferred embodiment of the present invention includes the ability to create a record for a digital image of a paper-based document before the digital image has been created. Additionally, the metadata to be associated with the digital image of the paper-based document is captured and stored by creating a reservation for the paper-based document before the digital image of the paper-based document has been captured. Additionally, the automatic capture of the metadata, using the reservation, provide the ability to link the metadata to the subsequently created digital image using the document identifier created at the time the reservation is made.

This methodology provides for a "one-click" process for creating a reservation and automatically capturing the appropriate metadata. The user does not need to manually enter any metadata at all.

Additionally, those skilled in the art will recognize that the methods and apparatus described herein provide for the integration of a facility for capturing paper-based documents and adding imaging capabilities to software applications that do not have native document capture capabilities. For example, using the methods described herein, a document capture button can be added to any standard application, thereby providing for the integration of digital images of paper-based documents into a database. By associating the metadata for a given paper-based document with the digital image of the paper-based document, the user can retrieve the digital image of the paper-based document whenever it is necessary or desired.

In summary, the present invention provides an apparatus and method for more quickly and efficiently capturing and storing the metadata associated with paper-based documents. By implementing the hardware/software combination herein, the time and effort required to convert paper-based documents to digital images, and associating those digital images with related computer-based information will reduced. Lastly, it should be appreciated that the illustrated embodiments are preferred exemplary embodiments only, and are not intended to limit the scope, applicability, or configuration of the present invention in any way. Rather, the foregoing detailed description provides those skilled in the art with a convenient road map for implementing the preferred exemplary embodiments of the present invention. Accordingly, it should be understood that various changes may be made in the function and arrangement of elements described in the various preferred exemplary embodiments without departing from the spirit and scope of the present invention as set forth in the appended claims.

The invention claimed is:

1. A method comprising the steps of:
    making a reservation for a digital image of a paper-based document;
    automatically capturing metadata associated with the paper-based document by scraping data from the computer screen;
    associating a pre-identified document identifier with the reservation and the metadata;
    affixing a label to the paper-based document, the label containing the pre-identified document identifier;
    creating a digital image of the paper-based document; and
    linking the digital image of the paper-based document with the metadata that was captured prior to the creation of the digital image of the paper-based document, using the pre-identified document identifier.

2. The method of claim 1 wherein the step of automatically capturing metadata associated with the paper-based document by scraping data from the computer screen comprises the step of capturing metadata from a previously identified location on the computer screen.

3. The method of claim 1 wherein the icon comprises some indicia to alert a user that the icon provides for creation of the reservation.

4. The method of claim 1 wherein the step of making a reservation for a digital image of a paper-based document comprises the step of making a reservation for a digital image of a paper-based document by clicking on an icon on a computer screen.

5. The method of claim 1 wherein:
    the step of automatically capturing metadata associated with the paper-based document by scraping data from the computer screen comprises the step of capturing metadata from a previously identified location on the computer screen; and the step of making a reservation for a digital image of a paper-based document comprises the step of making a reservation for a digital image of a paper-based document by clicking on an icon on a computer screen.

6. The method of claim 1 wherein the label comprises one of a plurality of sequentially numbered labels dispensed from a label dispenser.

7. The method of claim 1 wherein the label comprises one of a series of pre-printed label allocated to a user.

8. The method of claim 1 further comprising the step of storing the metadata in a database record.

9. An apparatus comprising:
at least one CPU;
a memory coupled to the at least one CPU;
a digital filing application residing in the memory, wherein the digital filing application:
    creates a reservation for a digital image of a paper-based document;
    automatically captures metadata associated with the paper-based document by scraping data from a computer screen; and
    associates a pre-identified document identifier with the reservation and metadata describing the paper-based document; and
and a sequentially numbered label affixed to the paper-based document, the label providing a link to each of the digital image of the paper-based document and the metadata, wherein the metadata was captured prior to the creation of the digital image of the paper-based document, using a pre-identified document identifier printed on the label.

10. The apparatus of claim 9 wherein the metadata associated with the paper-based document is automatically captured by scraping data from the computer screen at a previously identified location on the computer screen.

11. The apparatus of claim 9 wherein the icon comprises some indicia to alert a user that the icon provides for creation of the reservation.

12. The apparatus of claim 9 wherein the reservation for the digital image of the paper-based document is created by clicking on an icon on the computer screen.

13. The apparatus of claim 9 wherein the metadata associated with the paper-based document is obtained by scraping data from a previously identified location on the computer screen; and the reservation for the digital image of a paper-based document is created by clicking on an icon on the computer screen.

14. The apparatus of claim 9 wherein the label comprises one of a plurality of sequentially numbered labels.

15. The apparatus of claim 9 wherein the label comprises one of a series of pre-printed labels allocated to a user.

16. The apparatus of claim 9 wherein the metadata is stored in a database record.

17. A program product comprising:
a tangible computer-readable storage device; and
a digital filing application contained on the tangible computer-readable storage device, wherein the digital filing application:
    creates a reservation for a digital image of a paper-based document;
    automatically captures metadata associated with the paper-based document by scraping data from a computer screen; and
    associates a pre-identified document identifier with the reservation and metadata describing the paper-based document; and
and a sequentially numbered label affixed to the paper-based document, the label providing a link to each of the digital image of the paper-based document and the metadata, wherein the metadata was captured prior to the creation of the digital image of the paper-based document, using a pre-identified document identifier printed on the label.

18. The program product of claim 17 wherein the tangible computer-readable storage device comprises a CD.

19. The program product of claim 17 wherein the tangible computer-readable storage device comprises a hard disk drive.

* * * * *